US010625549B2

(12) United States Patent
Meyer et al.

(10) Patent No.: US 10,625,549 B2
(45) Date of Patent: Apr. 21, 2020

(54) WHEEL LINK FOR RECEIVING A BEARING IN A VEHICLE

(71) Applicant: Benteler Automobiltechnik GmbH, Paderborn (DE)

(72) Inventors: Stephan Meyer, Bielefeld (DE); Hauke Mehner, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 102 days.

(21) Appl. No.: 15/858,755

(22) Filed: Dec. 29, 2017

(65) Prior Publication Data
US 2018/0186203 A1 Jul. 5, 2018

(30) Foreign Application Priority Data

Jan. 5, 2017 (DE) .......................... 10 2017 100 169

(51) Int. Cl.
*B60G 7/00* (2006.01)
(52) U.S. Cl.
CPC .......... *B60G 7/001* (2013.01); *B60G 2204/41* (2013.01); *B60G 2204/418* (2013.01); *B60G 2204/422* (2013.01); *B60G 2206/017* (2013.01); *B60G 2206/10* (2013.01); *B60G 2206/11* (2013.01); *B60G 2206/8103* (2013.01); *B60G 2206/81022* (2013.01)

(58) Field of Classification Search
CPC .......... B60G 2204/41; B60G 2204/418; B60G 2204/422; B60G 2206/017; B60G 2206/10; B60G 2206/11; B60G 7/001; B60G 2206/81022; B60G 2206/8103
See application file for complete search history.

(56) References Cited

U.S. PATENT DOCUMENTS

| 1,909,100 | A | * | 5/1933 | Geyer | F16C 7/02 384/215 |
| 3,408,124 | A | * | 10/1968 | Melton | B60G 7/005 384/130 |
| 5,662,349 | A | * | 9/1997 | Hasshi | B21D 9/15 280/124.134 |
| 2006/0232038 | A1 | * | 10/2006 | Weise | B60G 7/001 280/124.134 |
| 2009/0277010 | A1 | * | 11/2009 | Runte | B21D 53/88 29/897.2 |

(Continued)

FOREIGN PATENT DOCUMENTS

DE 10 2011 052 398 A1 2/2013
DE 102011052398 * 2/2013 ............. B60G 7/001
(Continued)

*Primary Examiner* — Drew J Brown
(74) *Attorney, Agent, or Firm* — Hollard & Hart LLP

(57) ABSTRACT

The disclosure relates to a wheel link for receiving a bearing in a vehicle that comprises a single-piece wheel link body having a first wheel link end, a second wheel link end, and a connecting section that connects the first wheel link end and the second wheel link end. The single-piece wheel link body extends along a wheel link longitudinal axis. A sleeve-shaped eyelet is formed in the first wheel link end. And the first wheel link end is bulged to form a bearing sleeve for the bearing, increasing a diameter of the sleeve-shaped eyelet and a length of the eyelet transversely with respect to the wheel link longitudinal axis beyond the dimensions of the connecting section.

8 Claims, 2 Drawing Sheets

(56) References Cited

U.S. PATENT DOCUMENTS

| | | | |
|---|---|---|---|
| 2012/0001398 A1* | 1/2012 | Darcy-Sharma | B60G 7/006 280/124.125 |
| 2013/0042464 A1* | 2/2013 | Orcutt | B23P 6/00 29/525.11 |
| 2013/0069335 A1* | 3/2013 | Erdogan | B60G 7/001 280/124.128 |
| 2016/0280030 A1* | 9/2016 | Steber | B60G 7/02 |
| 2018/0001725 A1* | 1/2018 | Andou | B60G 3/28 |
| 2018/0154721 A1* | 6/2018 | Meyer | B60G 7/001 |
| 2018/0297439 A1* | 10/2018 | Meabe Zabala | B60G 7/001 |

FOREIGN PATENT DOCUMENTS

| | | | | |
|---|---|---|---|---|
| DE | 10 2016 123 499 A1 | 6/2018 | | |
| EP | 2330307 B1 * | 4/2015 | | B60G 7/001 |

* cited by examiner

WHEEL LINK FOR RECEIVING A BEARING IN A VEHICLE

CROSS-REFERENCE TO RELATED APPLICATIONS

This application claims priority to German patent application No. 10 2017 100 169.7, entitled "Radlenker für die Aufnahme eines Lagers in einem Fahrzeug", and filed on Jan. 5, 2017 by the assignee of this application, the entire disclosure of which is incorporated by reference for all purposes.

BACKGROUND

The present disclosure relates to a wheel link for receiving a bearing in a vehicle, in particular a motor vehicle.

Wheel links of a wheel suspension system of a vehicle are usually configured as sheet metal links, elastomer hybrid links or aluminium links in extrusion moulded or extruded form. A wheel link may be realized by way of a wheel link body with a bearing seat for receiving a bearing at at least one end of the wheel link body. A bearing seat can be configured at both wheel link ends, an additional bearing sleeve often being pressed into the bearing seat. To this end, an aluminium sleeve is usually pressed into the bearing seat, into which aluminium sleeve a rubber bearing is pressed. However, this procedure may ensures a fixed seat of the aluminium sleeve in the bearing seat.

SUMMARY

It is an object of the present disclosure to provide an improved wheel link.

This object is achieved by way of the features of the independent claims. Examples of the disclosure are the subject matter of the dependent claims, the description and the appended drawings.

The disclosure is based on the finding that the above object can be achieved by way of a single-piece wheel link, the wheel link end of which is bulged with an integrated sleeve-shaped eyelet to form a bearing sleeve for a bearing. The wheel link end is bulged in such a way that a diameter of the sleeve-shaped eyelet and a length of the sleeve-shaped eyelet transversely with respect to the wheel link longitudinal axis can be increased beyond the dimensions of the connecting section. In particular, a bearing can be held in the bearing sleeve of the wheel link end without the introduction of an additional bearing sleeve.

As a result, the problem of ensuring a fixed seat and/or guaranteeing a sufficiently accurate fit of the bearing sleeve are/is avoided efficiently and inexpensively. Furthermore, a wheel link of this type may decrease installation space and can be produced less expensively and in a simplified manner.

According to a first aspect, the disclosure relates to a wheel link for receiving a bearing in a vehicle, having a single-piece wheel link body which has a first wheel link end, a second wheel link end, and a connecting section which connects the first wheel link end and the second wheel link end, the single-piece wheel link body extending along a wheel link longitudinal axis, a sleeve-shaped eyelet being formed in the first wheel link end, and the first wheel link end being bulged to form a bearing sleeve for the bearing, in order to increase a diameter of the sleeve-shaped eyelet and a length of the sleeve-shaped eyelet transversely with respect to the wheel link longitudinal axis beyond the dimensions of the connecting section.

In particular, the single-piece manufacture of the wheel link by way of a single-piece wheel link body which has two wheel link ends which are shaped to form bearing sleeves brings about an efficient transmission of force through the wheel link, since the number of mechanical connections and therefore also the play, friction and/or stress within the wheel link can be reduced.

Furthermore, the wheel link can be manufactured from a plurality of individual parts. As a result of the multiple-piece manufacture of the wheel link, for example, different materials can be combined, or individual parts which can be manufactured in different manufacturing processes can be combined.

The inner face of the sleeve-shaped eyelet which is formed in the wheel link end forms the receiving face for a bearing. The said bearing receiving face can be maximized, by the inner face of the sleeve-shaped eyelet not having any apertures or similar voids. This facilitates the fixed seat of the bearing in the wheel link and therefore the transmission of force from the wheel bearing to the wheel link.

In one example, the diameter of the sleeve-shaped eyelet is constant over the length of the sleeve-shaped eyelet, with the result that, in particular, cylindrically formed bearings can be received in the wheel link sleeve in a positively locking manner.

The bulging of the wheel link end can bring about an increase in the volume of the wheel link end in all three spatial directions. It can be an extension of the wheel link body along the wheel link longitudinal axis, widening of the wheel link end in the region of the sleeve-shaped eyelet and/or an increase in the height of the wheel link end in the region of the sleeve-shaped eyelet. Here, a length in the X-direction, a width in the Y-direction and a height in the Z-direction are defined in accordance with the Cartesian coordinate system, the X-axis corresponding to the wheel link longitudinal axis.

In one example, the wheel link end is bulged by way of a process which maintains the material continuity, with the result that no cracks, fractures and/or stresses are produced in the material. The said processes include, for example, non-cutting pressure forming.

In one example, the wheel link is configured in such a way that the spatial dimensions both of the connecting section and of the bearing sleeve meet specifications for their function: the cross section of the connecting section corresponds to certain torsional and flexural stiffness; the wall thickness of the bearing sleeve corresponds to the certain compressive strength and holding strength for a bearing. In particular, the connecting section and the bearing sleeve are formed from the smallest possible material quantity, in order to reduce the weight of the wheel link.

In one example, a further sleeve-shaped eyelet is formed in the second wheel link end, and the second wheel link end is bulged to form a bearing sleeve for a further bearing, in order to increase a diameter of the further sleeve-shaped eyelet and a length of the further sleeve-shaped eyelet transversely with respect to the wheel link longitudinal axis beyond the dimensions of the connecting section.

In one example, the respective sleeve-shaped eyelet is delimited by way of edges which lie opposite one another and terminate flush with the outer face of the respective wheel link end or are formed as collars which project on both sides of the respective wheel link end. Here, the projecting collars can be formed in one working step together with the forming of a sleeve-shaped eyelet, by the material which is used during the forming of the sleeve-shaped eyelet being reshaped to form the collars, the plastic reshaping of the material may produce less or no discontinuity in the material.

The bearing can be, in particular, an elastomeric bearing without a bearing outer sleeve, with the result that a non-positive and/or positively locking connection can be effected directly between the elastomer of the elastomeric bearing and the bearing seat face. The elastomeric bearing may be pressed into the bearing seat.

The bearings which are introduced into the wheel link, in particular elastomeric bearings, damp vibration amplitudes of dynamic loads which act on the wheel link, and contribute to the realization of elastic kinematic properties of an arrangement of wheel links, in particular of a wheel suspension system.

In one example, the single-piece wheel link body is an extruded profile. This makes complex shaping of the cross section of the connecting section possible, which cross section can therefore have a profile which differs from a round or rectangular shape and may change the stiffness of the wheel link.

In one example, the single piece wheel link body is formed from solid material, in particular solid metal. The wheel link body can also be produced from a plate, in particular can be pressed, punched or milled from a plate piece.

In one example, the respective wheel link end is bulged by way of a plastic deformation of the single-piece wheel link body. The final shape of the wheel link end is complex and can be realized by way of the process of bulging in a cost-efficient manner and with lower material outlay in comparison with other manufacturing methods, in particular pressing a plurality of shaped parts or milling from a solid material main body. A reduction of the material consumption for a wheel link, the manufacturing time for a wheel link and/or the manufacturing costs for a wheel link can thus be achieved.

In one example, the respective sleeve-shaped eyelet forms or replaces a bearing sleeve of a bearing. By way of a bearing being received in the bearing sleeve, the bearing can be introduced, in particular can be pressed, into the sleeve-shaped eyelet without an additional bearing sleeve. As a result, the weight of the wheel link can both be reduced, and the manufacturing method of the wheel link can be adapted, in particular in order to reduce the pressing in of an additional sleeve. The material outlay for a wheel link and the manufacturing time for a wheel link can be reduced.

In one example, the single-piece wheel link body has angled sections which can change the installed position of the wheel link and can reduce the installation space for the wheel link.

In one example, a longitudinal axis of the sleeve-shaped eyelet runs at a right angle or at an acute angle with regard to the wheel link longitudinal axis. The relative arrangement of the bearing seats with respect to one another can be selected in almost any desired manner as a result. Restrictions in the orientation can result from the overlap of the bearing with the wheel link body. In combination with angled sections of the wheel link body, any desired orientation of the bearing seat in the wheel link ends can be achieved. The attachment of the wheel link is therefore not subject to any geometric restrictions. In this way, a selection of the installed position of the wheel link may be achieved with efficient utilization of the available installation space for the wheel link.

In one example, the connecting section has a circular cross section. Here, the cross section of the single-piece wheel link body can vary along the wheel link longitudinal axis. The material thickness can thus be adapted in accordance with the forces which occur in the wheel link, and sections which are less loaded have a smaller cross section. As a result, the weight of the wheel link can be reduced with constant functional properties of the wheel link.

According to a second aspect, the disclosure relates to a method for producing a wheel link for receiving a bearing in a vehicle, comprising provision of a single-piece wheel link body with a wheel link end, production of an aperture in the wheel link end, and mechanical widening of the aperture, those regions of the outer face of the wheel link end which delimit the aperture being reshaped towards the outside during the widening, in order to obtain a sleeve-shaped eyelet for receiving a bearing. The introduction of a bearing into the wheel bearing end can take place by way of the bearing being pressed into the sleeve-shaped eyelet.

In one example, collars which project on both sides of the wheel link end are formed during the mechanical widening. The bearing sleeve has an inner face which can serve as a bearing seat face for a bearing. The said bearing seat face can be extended by way of the formed collars.

In one example, the mechanical widening of the aperture takes place by means of a stationary ram or a rotating ram or a roller burnishing tool. It is a common feature of all tools that they can plastically deform the material of the wheel link body incrementally by way of a tool head which is harder than the material of the wheel link body. As a result, precise forming of the bearing sleeves in the wheel link ends can be ensured.

In one example, the wheel link end is deformed plastically by way of flattening before the production of an aperture in the wheel link end. The initial flattening increases the outer area of the wheel link end, with the result that less material has to be consumed during the subsequent widening of the apertures by way of incremental reshaping by way of one of the abovementioned tools. As a result, the forming of the bearing sleeves in the wheel link ends can be accelerated, and the production time for a wheel link may be reduced.

BRIEF DESCRIPTION OF THE DRAWINGS

Further exemplary examples of the disclosure will be explained in greater detail with reference to the appended drawings, in which.

DETAILED DESCRIPTION OF THE DRAWINGS

Figure 1:
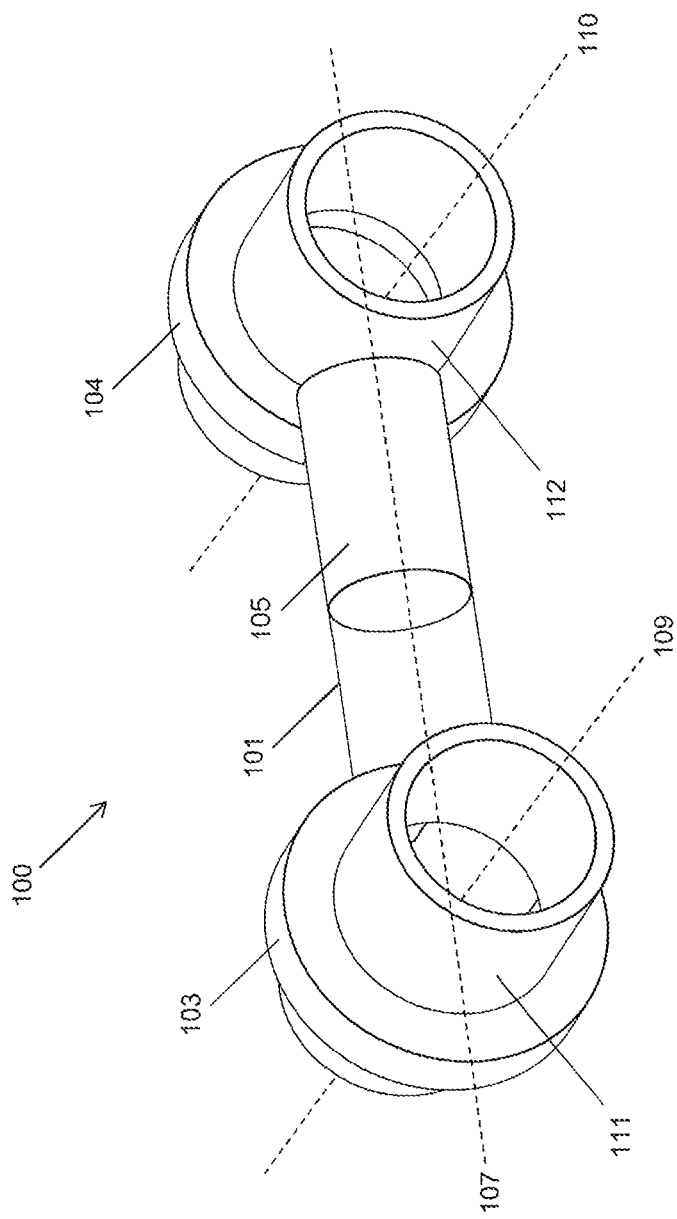
FIG. 1 shows a wheel link in accordance with the present disclosure.

FIG. 1 shows a diagrammatic illustration of a wheel link 100 having a single-piece wheel link body 101 which has a first wheel link end 103, a second wheel link end 104, and a connecting section 105 which connects the first wheel link end 103 and the second wheel link end 104. The single-piece wheel link body 101 extends along a wheel link longitudinal axis 107. A sleeve-shaped eyelet 109 is formed in the first wheel link end 103, and the first wheel link end 103 is bulged to form a bearing sleeve 111 for receiving a bearing, in order to increase a diameter of the sleeve-shaped eyelet 109 and a length of the sleeve-shaped eyelet transversely with respect to the wheel link longitudinal axis 107 beyond the dimensions of the connecting section 105.

Furthermore, a further sleeve-shaped eyelet 110 is formed in the second wheel link end 104, and the second wheel link end 104 is bulged to form a further bearing sleeve 112 for receiving a further bearing.

In one example, the cross section of the wheel link body 101 changes in the direction of the wheel link ends 103 and 104, with the result that the transition between the wheel link body 101 and the wheel link end 103 and the transition between the wheel link body 101 and the wheel link end 104 is free from edges and/or apertures.

The fixed seat of a bearing in the bearing sleeve 111 is determined via a minimum contact area between the wheel link end 103 and the outer face of the bearing. The size of the contact area between the bearing and the bearing sleeve is directly proportional to the holding force which acts between the bearing and the bearing seat.

Figure 2:
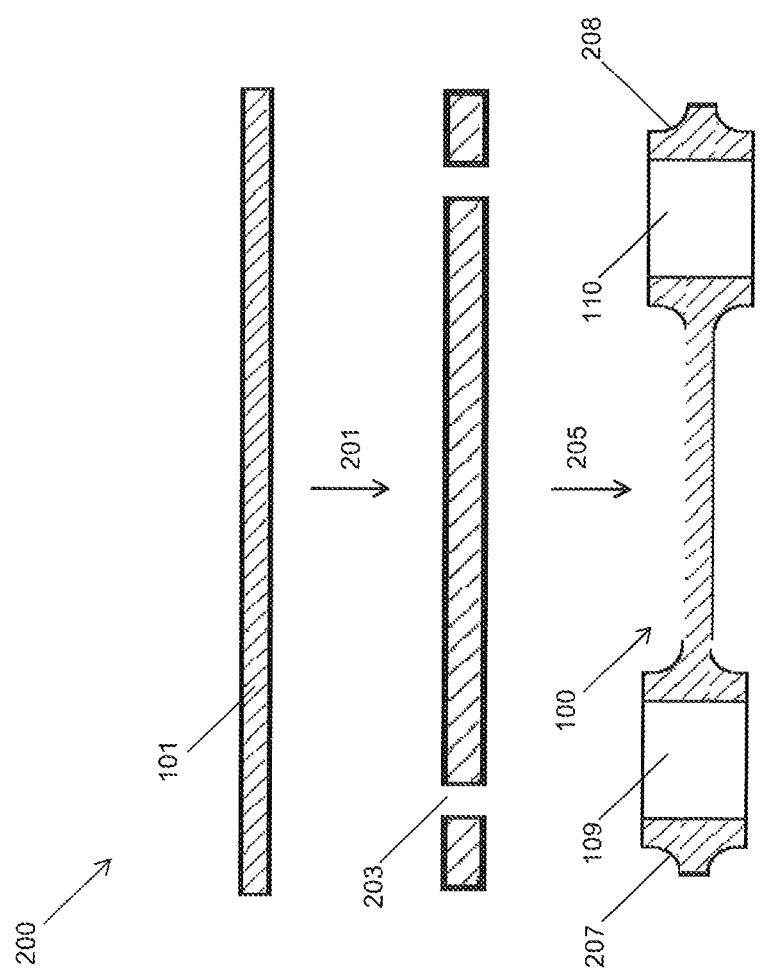
FIG. 2 shows a method for producing a wheel link in accordance with the present disclosure.

FIG. 2 shows a method 200 for producing the wheel link 100 for receiving a bearing in a vehicle.

The intermediate products of the wheel link 100 are shown as a cross section in a side view transversely with respect to the link longitudinal axis 107.

The method 200 comprises the production 201 of an aperture 203 in the wheel link end 103. A further aperture 204 is optionally produced in the further wheel link end 104.

Subsequently, the mechanical widening 205 of the aperture 203 and of the aperture 204 is carried out. Those regions of the outer face 207 of the wheel link end 103 which delimit the aperture 203 are preferably reshaped towards the outside during the widening 205, in order to obtain a sleeve-shaped eyelet 109 for receiving a bearing. In one example, those regions of the outer face 207 of the wheel link end 103 which delimit the aperture 203 can be reshaped towards the outside after the widening 205.

In one example, the regions of the outer face 208 of the wheel link end 104 are reshaped towards the outside during the widening 205, in order to obtain a sleeve-shaped eyelet 110 for receiving a further bearing.

In one example, the widening 205 of the apertures 203, 204 takes place by way of incremental plastic deformation.

The regions which are reshaped towards the outside can form circumferential collars which border the sleeve-shaped eyelets 109 and 110. The outer sides of the collars can be concavely formed.

The reshaping of the wheel link ends 103 and 104 can also comprise only one part of the material of the wheel link end, with the result that non-deformed regions can surround the sleeve-shaped eyelets 109 and 110 in the wheel link ends 103 and 104.

LIST OF REFERENCE NUMBERS

100 Wheel link
101 Wheel link body
103 First wheel link end
104 Second wheel link end
105 Connecting section
107 Wheel link axis
109 Eyelet
110 Eyelet
111 Bearing sleeve
112 Bearing sleeve
200 Method for producing a wheel link
201 Production of an aperture
203 Aperture
204 Aperture
205 Mechanical widening
207 Outer face
208 Outer face

What is claimed is:

1. A method for producing a wheel link for receiving a bearing in a vehicle, comprising:
provisioning a single-piece wheel link body with a first heel link end and a second wheel link end;
producing a first aperture in the first wheel link end; and
mechanically widening the first aperture, wherein regions of an outer face of the first wheel link end that delimit the first aperture are reshaped towards the outside of the first wheel link end during the mechanical widening to obtain a first sleeve-shaped eyelet for receiving a first bearing;
producing a second aperture in the second wheel link end; and
mechanically widening the second aperture, wherein regions of the outer face of the second wheel link end that delimit the second aperture are reshaped towards the outside of the second wheel link end during the mechanical widening to obtain a second sleeve-shaped eyelet for receiving the first bearing or a second bearing, wherein the first sleeve-shaped eyelet and the second sleeve-shaped eyelet form a bearing sleeve,
wherein the first sleeve-shaped eyelet and the second sleeve-shaped eyelet are formed as collars which project on both sides of their respective wheel link ends.

2. The method according to claim 1, wherein the first aperture is mechanically widened by a stationary rani, a rotating ram, or a roller burnishing tool, or any combination thereof.

3. The method according to claim 1, further comprising:
plastically deforming the first wheel link end before the production of the first aperture in the first wheel link end.

4. The method according to claim 3, wherein plastically deforming the first wheel link end comprises flattening the first wheel link end or the single-piece wheel link body, or both.

5. The method according to claim 1, wherein the first bearing is a sleeve-shaped beating, the method further comprising:
introducing the sleeve-shaped bearing into the bearing sleeve formed by the first sleeve-shaped eyelet and the second sleeve-shaped eyelet.

6. The method according to claim 5, further comprising:
plastically deforming the first wheel link end and the second wheel link end before the production of the first aperture in the first wheel link end and the second aperture in the second wheel link end.

7. The method according to claim 6, wherein plastically deforming the second wheel link end comprises flattening the second wheel link end or the single-piece wheel link body, or both.

8. The method according to claim 1, further comprising:
forming the single-piece wheel link body from a solid material.

* * * * *